May 13, 1941.
C. ZISCHKAU ET AL
2,241,438
RECOVERING INDIUM
Filed July 12, 1940
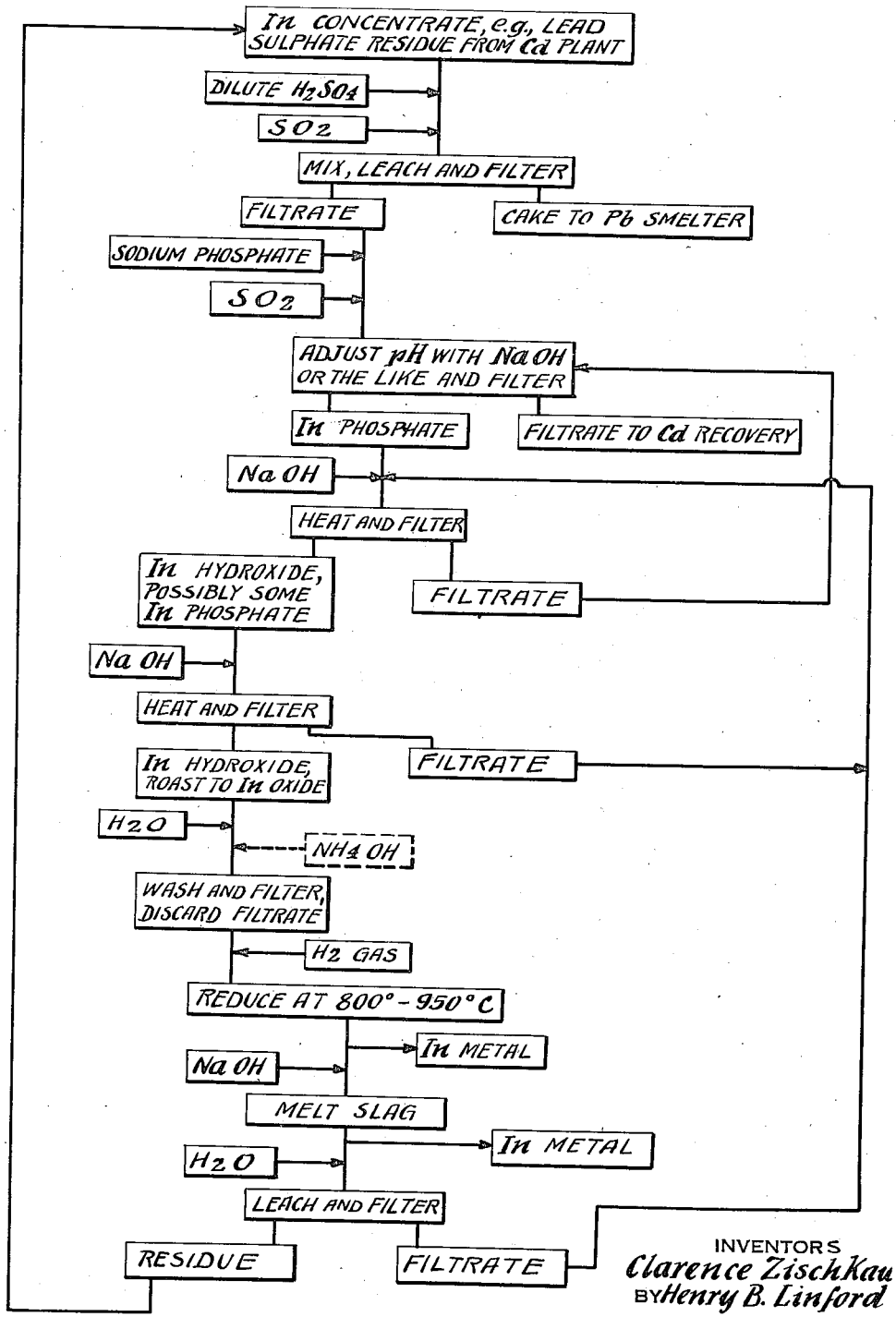
INVENTORS
Clarence Zischkau
BY Henry B. Linford
James K. Kent
ATTORNEY Patented May 13, 1941

2,241,438

UNITED STATES PATENT OFFICE 2,241,438

RECOVERING INDIUM

Clarence Zischkau and Henry B. Linford, Woodbridge, N. J., assignors to American Smelting and Refining Company, New York, N. Y., a corporation of New Jersey Application July 12, 1940, Serial No. 345,056

8 Claims. (Cl. 75—121)

The present invention deals with certain improvements in the recovery of indium from indium-bearing materials, and has for its principal object the provision of a direct and economical process for the separation and recovery of this metal, wherein there are avoided many of the manipulations which have been necessary heretofore for the accomplishment of this purpose.

The invention will be understood more clearly by reference to the accompanying drawing, the single view of which shows a diagrammatic flow-sheet illustrating the essential steps of the process.

It will be recalled that, like cadmium, indium commonly occurs as a minor constituent of certain zinciferous ores and, upon roasting such ores, the indium passes into the fume together with cadmium, lead, arsenic and other components. In the usual practice of treating the fume for the recovery of the bulk of its cadmium content, there remains a so-called lead sulphate residue comprising the indium and such ingredients as arsenic, cadmium, lead, and iron.

While the bulk of the indium will be found in the aforesaid sulphate residues, nevertheless the actual quantity of indium in such a residue is small so that one is confronted with the problem of separating a small quantity of indium from large quantities of other residue components. Thus, while the indium may be extracted readily from the residue by leaching with a suitable acid, such as sulphuric acid, or a saturated aqueous solution of sulphur dioxide, large quantities of other constituents of the residue, such as cadmium and arsenic, are also dissolved by the leach so that one still faces the problem of separating the small amount of indium from the other components of the leach solution. Further, if it is sought to precipitate the indium by simple neutralization of the leach solution, it will be found that large quantities of cadmium and arsenic will precipitate.

Referring to the accompanying flow-sheet, it will be seen that the present process includes the precipitation of indium from the indium-containing leach solution as indium phosphate, the conversion of the indium phosphate into indium oxide, and the reduction of the oxide to indium metal. The indium precipitates selectively as phosphate.

In carrying out the invention, the initial step ordinarily is that of extracting the indium from the indium-bearing material by leaching with dilute acid, sulphuric acid being the preferred solvent. The indium-bearing material may vary, of course, in origin, but for purposes of illustration it may be assumed to comprise the lead sulphate residue from a typical cadmium plant as indicated in the flow-sheet, in which event the leached solution will contain, normally, not only the indium, but also arsenic, cadmium, iron, tin, and other constituents of the starting material as well.

The presence of iron in the leach solution may or may not interfere with the subsequent selective precipitation of the indium depending upon whether such iron is present in the ferric or ferrous state. Accordingly, as a precautionary measure, the leach solution should be treated with a reducing agent in order to assure that iron, if present, is maintained in the reduced condition. This can be accomplished readily by the addition of sulphur dioxide to the leach solution either simultaneously with, or subsequent to, the leaching.

Following the reducing treatment, the indium is precipitated selectively from the leach solution to the substantial exclusion of such elements as arsenic, cadmium, and iron, by adding a soluble phosphate to the leach solution and adjusting, if necessary, the hydrogen ion concentration of the latter to a proper value. The soluble phosphate used may be any of those containing the $PO_4$ radical. As to hydrogen ion concentration, it has been found that a pH value within the approximate range of 2.5 to 4.0 should be observed.

This treatment precipitates the indium substantially completely as is shown in the copending application of Clarence Zischkau, Serial No. 323,092, filed March 9, 1940, in which the phosphate precipitation of indium is disclosed and claimed.

This indium phosphate now is converted into indium oxide, it being important that this conversion be complete in order that reduction of the indium may be made smoothly and to avoid too much indium run-around in the residue from the reduction.

The conversion of the indium phosphate into metallic indium is accomplished by way of indium hydroxide. To convert into the hydroxide the indium phosphate is treated with caustic soda. Various procedures for so doing are open, but it is found that the simplest procedure is to boil the indium phosphate in a solution of caustic soda.

The resulting indium hydroxide is filtered, washed, and dehydrated or roasted, to indium oxide, which then may be reduced to metal, preferably by passing hydrogen thereover at temperatures below such as will vaporize the indium substantially. A reduction temperature of from 800 to 850° C. is found to be satisfactory. The resulting metallic indium may be refined electrolytically, if desired.

The details of the preferred procedure are indicated by the following specific example:

Two thousand pounds of indium-bearing lead sulphate residues were mixed with 650 gallons of water and 1,100 lbs. of concentrated sulphuric acid (95% $H_2SO_4$), the liquid mixture being treated with 28 lbs. of sulphur dioxide.

The resulting material was filtered and washed, there being recovered 1,528 lbs. of filter-cake, assaying 0.3% In (4.58 lbs.), and 0.6% Cd (9.16 lbs.), which cake was sent to the lead smelter.

The filtrate measured 750 gallons and assayed, In 0.0588 lb./gal. (total 44.1 lbs.), Cd 0.116 lb./gal. (total 87.2 lbs.).

This filtrate was heated to 60° C., and to it were added 72 lbs. of trisodium phosphate ($Na_3PO_4.12H_2O$), and since at least some of the iron present may become oxidized to the ferric condition, 10 lbs. of $SO_2$ were introduced into the filtrate to reduce this iron to the ferrous condition.

The solution then was neutralized to a pH of 3 by the addition of 604 lbs. of caustic soda. This pH adjustment caused the indium to precipitate as indium phosphate.

The precipitated indium phosphate was filtered and the filtrate (1000 gallons assaying In, nil, Cd 0.0692 lb./gal., total 76.2 lbs.) sent to the cadmium recovery.

In order to purify the precipitated indium phosphate, it was dissolved in 112 lbs. of concentrated sulphuric acid in 740 gallons of water. The resulting solution was heated to 60° C., and 28 lbs. of $Na_3PO_4.12H_2O$ were added, together with 10 lbs. of $SO_2$.

The resulting solution was neutralized to pH=3.08 by the addition of 133 lbs. of caustic soda, this treatment re-precipitating the indium phosphate which was filtered. The filtrate measured 1000 gallons, assaying, In nil; Cd 0.00736 lb./gal. or a total of 7.36 lbs. Cd. The filtrate accordingly was sent to the cadmium recovery.

The indium phosphate filter cake was mixed with 190 lbs. caustic soda in 160 gallons of water, and the mixture was boiled for 1 hour. This converted the indium phosphate into indium hydroxide with a liquor composed essentially of sodium phosphate and caustic soda, which may be reused for the conversion of further quantities of indium phosphate into indium hydroxide.

The indium hydroxide filter cake was roasted at 650° C. to convert the same into indium oxide. The roast was washed with 40 gallons of water (or, preferably dilute ammonium hydroxide (28%) to remove any copper or silver that may be present, or any other impurities soluble in the ammonium hydroxide).

The roast which is insoluble material is filtered, the filtrate being discarded, and reduced to metallic indium preferably by contacting hydrogen therewith at temperatures of 800°–850° C. to avoid volatilization losses of indium.

There were produced 32.55 lbs. of metallic indium of 99% purity, which may be marketed as such, or electrolytically refined.

Also during the reduction there were formed 18.6 lbs. of an indium-bearing residue. This residue was fused with 2 lbs. of caustic soda at 400° C., there being produced an additional 5.6 lbs. of metallic indium which may be marketed as such, or electrolytically refined.

The caustic slag from this fusion was leached with 30 gallons of water, and filtered, the filtrate being discarded, and the filter cake, weighing 14.4 lbs., and containing 23% of indium, was returned to the original leaching stage with fresh quantities of concentrates.

The present process offers important economic advantages, in addition to simplicity of operation. Thus, in operating on further quantities of concentrates, the second filtrate that is obtained, (the filtrate resulting from the washing of the filter cake produced by the filtration of the leach solution from the leached concentrates) may be used for leaching of further quantities of concentrate, as this filtrate contains substantial amount of sulphuric acid.

Also, the filtrate from the phosphate conversion contains sodium phosphate and sodium hydroxide and may be reused in the precipitation of further quantities of indium phosphate.

It will be apparent of course that variations in operating details may be made without departing from the scope of this invention. Thus, for instance, hydrochloric acid may replace the sulphuric acid used for the leach, although it is open to the objection that chlorides are washed from the indium phosphate precipitate only with difficulty, and their presence in the reduction furnace is objectionable because indium chloride is formed, and this is volatile, thereby causing indium losses which are commensurate with the amount of chlorides in the indium oxide being reduced.

Also, sodium carbonate may be used instead of sodium hydroxide for the pH adjustment for effecting the indium phosphate precipitation. However, the use of the soda ash entails a loss of sulphur dioxide from the solution, because the evolution of carbon dioxide, due to carbonate neutralization, effectively aerates the solution. There should be maintained a high sulphur dioxide concentration in the solution prior to the precipitation of the indium.

The precipitation of the indium phosphate is carried out preferably with the solution heated, owing to the precipitated phosphate being in a physical form amenable to rapid filtration, whereas it is found that precipitation of the phosphate at room temperatures results in a condition that is filterable only very slowly.

The conversion of the indium phosphate into indium hydroxide may be accomplished preferably by the method given above, that is by boiling it in a strong caustic soda solution, the converted indium hydroxide filtering easily. However, the conversion may be effected by agitation of the materials in a ball mill or pebble mill, a strong caustic solution being used also in this adaptation of the process.

The roasting of the indium hydroxide may be optional although it is preferred to include this step in the operation. When the indium phosphate is precipitated the solution resulting from the precipitation includes considerable amounts of sodium sulphate which is difficultly separable from the precipitated phosphate, and any such residual sodium sulphate becomes enveloped in the gelatinous indium hydroxide produced when the phosphate is converted into hydroxide. The roasting converts the hydroxide into oxide and releases this included sodium sulphate and other impurities to enable these materials to be dissolved by a water leach of the roast. Additionally, the roasting converts the indium to a highly insoluble form and renders it readily filterable.

It is found in practice that while the dehydration of the indium hydroxide starts at low temperatures, the complete dehydration is not effected until a red heat is reached. As has been said above, the resulting indium oxide is in a form which is washable readily, which is of importance since it is desirable that the indium oxide going to the reducing furnace is of maximum possible purity.

What is claimed is:

1. A process for separating indium from indium-containing materials which comprises acid leaching the materials, precipitating the indium as phosphate by adding soluble phosphate to the solution while controlling the pH value of the solution between approximate limits of 2.5 and 4.0, converting the indium phosphate into indium oxide by reacting upon the phosphate with caustic alkali and roasting the resulting indium hydroxide to indium oxide, and reducing the oxide to metallic indium.

2. A process for separating indium from indium-containing materials which comprises acid leaching the materials, precipitating the indium as indium phosphate by neutralizing the solution to a pH value of approximately 3 and adding a soluble phosphate thereto while maintaining in ferrous condition any iron present in the solution, digesting the precipitated phosphate with a solution of caustic soda until the phosphate is converted into hydroxide, roasting the hydroxide to oxide, reducing the oxide to metallic indium, and refining the indium.

3. The process for treating sulphate residues from cadmium plant operations which comprises acid leaching such residues, reducing any ferric iron in the leach solution to the ferrous state, incorporating a soluble phosphate in the leach solution at a pH value favorable to precipitation of indium but unfavorable to precipitation of cadmium, treating the indium precipitate with an alkali, calcining the resulting indium hydroxide to produce indium oxide, and converting the indium oxide to metallic indium.

4. A process for recovering indium from materials containing cadmium, arsenic, and indium which comprises effecting a solution of the said materials, adjusting the pH value of the solution to a range between approximately 2.5 to 4.0, adding a soluble phosphate to the adjusted solution to precipitate indium phosphate therefrom, all while maintaining the iron in ferrous condition, separating the indium phosphate from the solution containing the cadmium and arsenic, treating the indium phosphate with an alkali to convert the phosphate into hydroxide, dehydrating the indium hydroxide, and converting the resulting indium oxide into metallic indium.

5. The process for treating the sulphate residues from cadmium plant operations which comprises acid leaching such residues to effect a solution which contains cadmium, arsenic and indium, reducing any ferric iron in the leach solution to the ferrous state, incorporating an excess of a soluble phosphate in the leach solution at a pH value favorable to precipitation of indium but unfavorable to precipitation of cadmium, separating the resulting precipitated indium phosphate from the solution which contains substantially all of the cadmium leached from the residues, treating the indium phosphate with an aqueous solution of caustic alkali until the indium phosphate is converted into indium hydroxide, separating the indium hydroxide from the solution, roasting the indium hydroxide to indium oxide to convert the indium into insoluble and readily filterable form, washing the indium oxide to remove soluble contaminants associated therewith, and reducing the indium oxide to metallic indium.

6. The process for treating the sulphate residues from cadmium plant operations which comprises acid-leaching such residues to produce a solution which contains indium, cadmium, and arsenic, reducing any dissolved iron to ferrous condition, separating this indium-bearing solution from insoluble residues, washing the said residues with acid, separating the wash liquid from insoluble residues, smelting the said residues to metallic lead, returning the acid wash liquid for leaching fresh quantities of the said sulphate residues, incorporating a soluble phosphate in the indium-bearing leach solution with the pH value thereof adjusted to be favorable to precipitation of indium but unfavorable to precipitation of cadmium, separating the resulting indium phosphate from the solution, recovering cadmium from the solution, treating the indium phosphate with a solution of caustic alkali until the indium phosphate is converted into indium hydroxide, separating the indium hydroxide from the solution, returning the solution to precipitate additional fresh indium phosphate from fresh leach solution, re-treating the indium hydroxide with further quantities of caustic alkali solution to assure complete conversion of the indium phosphate into indium hydroxide, returning the resulting solution for conversion of fresh quantities of indium phosphate, converting the indium hydroxide into indium metal, fusing the residue from the said conversion with a caustic slag to produce additional quantity of metallic indium, leaching the slag with water, and returning the resulting insoluble material to the acid leach.

7. The process for treating the sulphate residues from cadmium plant operations which comprises acid-leaching the said residues to produce a solution which contains indium, cadmium, and arsenic, reducing any dissolved iron to ferrous condition, separating this indium-bearing solution from insoluble residues, washing the said residues with acid, separating the wash liquid from insoluble residues, smelting the said residues to metallic lead, returning the acid wash liquid for leaching fresh quantities of the said sulphate residues, incorporating a soluble phosphate in the indium-bearing leach solution with the pH value thereof adjusted to be favorable to precipitation of indium but unfavorable to precipitation of cadmium, separating the resulting indium phosphate from the solution, recovering cadmium from the solution, treating the indium phosphate with a solution of caustic alkali until the indium phosphate is converted into indium hydroxide, separating the indium hydroxide from the solution, returning the solution to precipitate fresh indium phosphate from fresh leach solution, re-treating the indium hydroxide with further quantities of caustic alkali solution to assure complete conversion of the indium phosphate into hydroxide, returning the resulting solution to treat fresh quantities of indium phosphate therewith, and reducing the indium hydroxide to metallic indium.

8. The process for treating the sulphate residues from cadmium plant operations which comprises acid-leaching the said residues to produce a solution which contains indium, cadmium, and arsenic, reducing any dissolved iron to ferrous condition, separating this indium-bearing solution from insoluble residues, adjusting the pH value of the solution to a value favorable to the precipitation of indium phosphate but unfavorable to precipitation of cadmium, adding a water-soluble phosphate to the solution to precipitate indium phosphate therefrom, converting the indium phosphate to indium hydroxide, and reducing the indium hydroxide to metallic indium.

CLARENCE ZISCHKAU.
HENRY B. LINFORD.

CERTIFICATE OF CORRECTION.

Patent No. 2,241,441.                                          May 13, 1941.

ADOLPH F. BANDUR.

It is hereby certified that error appears in the printed specification of the above numbered patent requiring correction as follows: Page 2, second column, line 26, claim 1, strike out the word "member" and insert the same after "second", line 24, same claim; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.